United States Patent Office 3,358,764
Patented Dec. 19, 1967

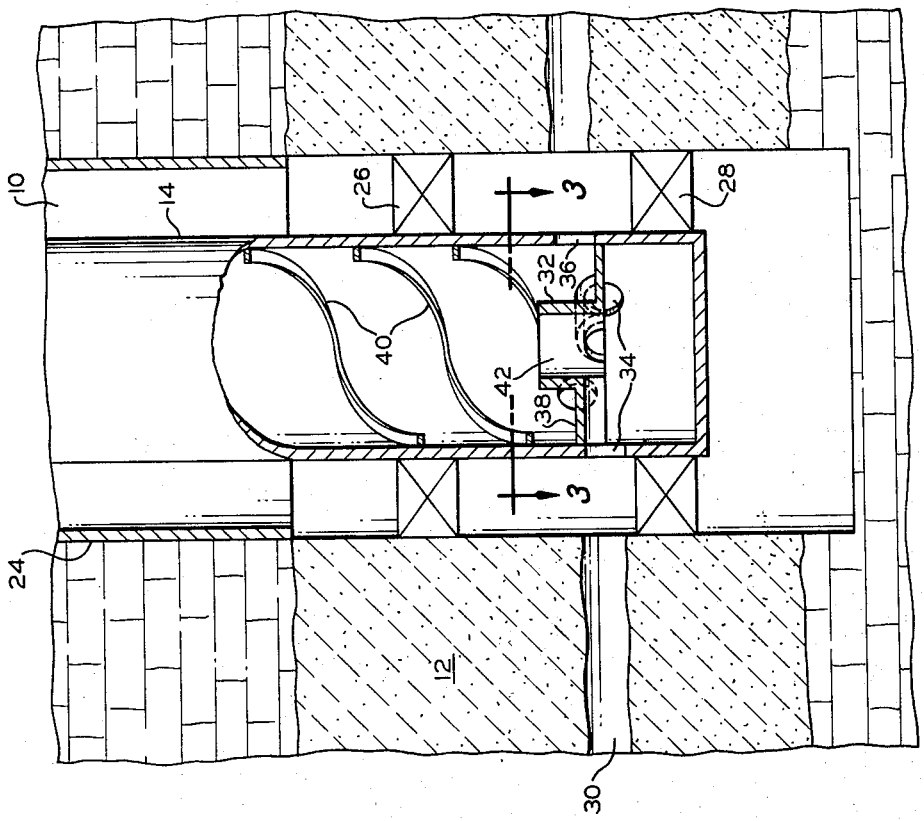
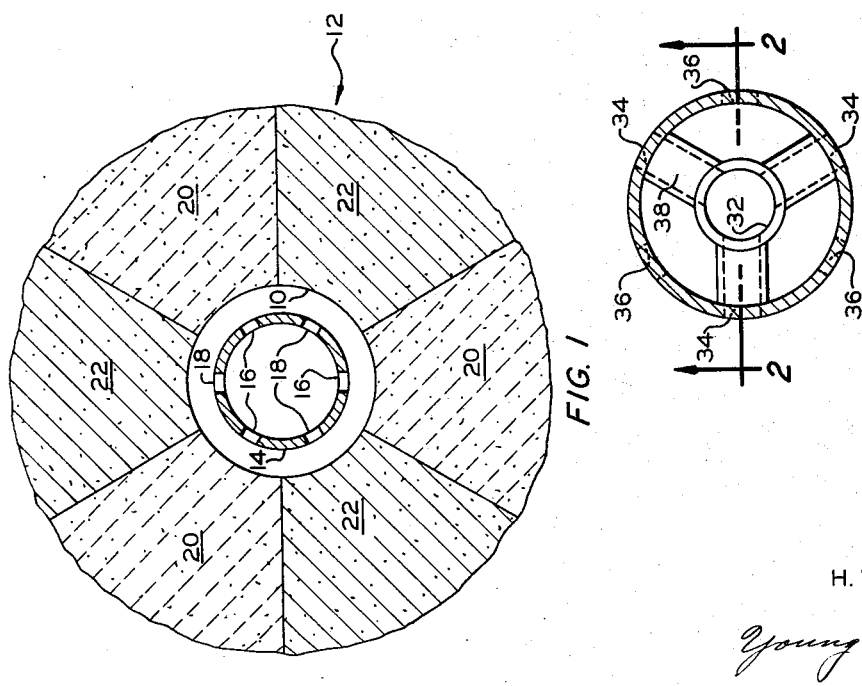

3,358,764
METHOD OF FRACTURING SUBTERRANEAN STRATA
Harry W. Parker, Bartlesville, Okla., assignor to Phillips Petroleum Company, a corporation of Delaware
Filed July 16, 1965, Ser. No. 472,454
11 Claims. (Cl. 166—42)

ABSTRACT OF THE DISCLOSURE

A subterranean stratum is fractured with a suitable fracturing fluid thru a well penetrating the stratum followed by injecting sequentially into alternate segmental portions of the fracture around the well, a permanent propping agent and a temporary (fluidizable) propping agent, after which the temporary propping agent is fluidized and rendered ineffective as a propping agent to provide improved flow paths for fluids thru the fracture.

---

This invention relates to a method or process for fracturing and propping a subterranean stratum to provide high permeability, particularly for the flow of oil thru the fracture.

To increase the production rate from a well penetrating an oil-bearing stratum, it is desirable to create radial, large diameter flow channels from the well extending well into the producing stratum. To date, hydraulic fracturing has been the most successful method of increasing permeability and production rates. The major problem in hydraulic fracturing is maintaining the fracture open with propping agents. These propping agents must support the weight of the overburden and frequently the propping agents are crushed by the overburden load and the permeability of the fracture is greatly reduced, if not lost.

This invention is concerned with a method of fracturing and propping which creates large radial flow channels and leaves the overburden supported.

Accordingly, the principal object of the invention is to provide a method of fracturing and propping a subterranean stratum which produces large radial flow channels. Another object is to provide a process for fracturing and propping an oil-bearing stratum which facilitates oil production therefrom. A further object is to provide a propping method which substantially increases the flow capacity of radial flow channels within a radial fracture. It is also an object of the invention to provide a fracturing and propping technique which is particularly suitable for use in preparing an oil-bearing stratum for production by steam or in situ combustion drive. Other objects of the invention will become apparent to one skilled in the art upon consideration of the accompanying disclosure.

A broad aspect of the invention comprises fracturing a subterranean stratum by injecting a suitable fracturing fluid into the stratum thru a well therein, simultaneously and separately injecting a permanent propping agent and a temporary propping agent, and thereafter removing the temporary propping agent so as to leave highly permeable radial flow paths formerly occupied by the temporary propping agent, the two types of propping agents being injected into separate alternately spaced apart, radially extending sections of the stratum surrounding the injection well. The temporary propping agent is one which can be dissolved, melted, or burned to destroy same as a propping agent in the alternate spaced sections of the fracture in which they were injected.

The function of the temporary propping agent is to occupy selected alternate sections of the fracture so as to exclude the permanent propping agent from these areas. In this manner, upon removal of the temporary propping agent, alternate sections of the fracture are left completely open so as to materially increase the permeability and flow paths thru the fracture.

The temporary propping agent may be soluble, meltable, or combustible. Propping agents which are readily soluble include rock salt, rock sugar (rock candy), calcium chloride, potassium chloride, sodium sulfate, calcium carbide, and other well-known materials which are soluble in such solvents as water, hydrocarbons, etc. Propping agents which melt readily at slightly elevated temperatures include naphthalenes and hard waxes. Propping agents which are readily combustible include nut shells, combustible resins or polymers. Nut shells may also be utilized as the permanent propping agent when used with a soluble or meltable temporary propping agent. Other permanent propping agents include metal pellets, such as aluminum, glass beads, sand, polyolefin pellets, and other pellet resins when excessive heating or combustion is not utilized to remove the temporary propping agent or in producing the stratum after the permanent propping agent has been deposited in the fracture.

The fracturing technique is conventional in the art and needs no detailed discussion. Sufficient pressure is applied on the stratum at a selected level by building up pressure in the injected fluid so as to induce a radially extending fracture from the injected well.

A good combination of propping agents comprises nut shells, such as walnut shells, and rock salt. The nut shells are suitable permanent propping material for various types of production methods except production by in situ combustion. When propping for in situ combustion, it is feasible to utilize the nut shells as the temporary propping agent with a permanent propping agent in the form of metal pellets, glass beads, or sand. The combustible resins also provide good temporary propping material, removable by in situ combustion. When using the combination of nut shells and rock salt, the rock salt is dissolved in water which may be produced from the stratum or injected thru the injection well until the salt dissolves and is substantially removed from the fracture.

A more complete understanding of the invention may be had by reference to the accompanying schematic drawing of which FIGURE 1 is a plan view of an arrangement of propping material in a fracture around an injection well thru which the fracturing fluid has been injected; FIGURE 2 is a partial section taken on the line 2—2 of FIGURE 3 of a downhole arrangement of tubing and injection means for separately injecting a propping agent into a fracture; and FIGURE 3 is a horizontal cross section taken on the line 3—3 of FIGURE 2.

In FIGURE 1, a well 10 penetrates an oil-bearing stratum 12 and is provided with a tubing string 14. Injection holes 16 in tubing 14 are alternately spaced with respect to injection holes 18. By simultaneously injecting both permanent and temporary propping agents in the manner described below, sections 20 of the fracture are filled with permanent propping agent while alternate sections 22 are filled with a temporary propping agent.

Referring to FIGURES 2 and 3, well 10 is provided with a casing 24 extending to about the upper boundary of stratum 12. Tubing string 14 extends into stratum 12 and is closed at the lower end. Packers 26 and 28 pack off the annulus at a selected level for fracture 30. Distribution baffle 32 is provided within tubing string 14 which provides a series of holes 34 below baffle 32 for injection of a lower density propping agent and another series of holes 36 for injection of higher density propping agent, alternately spaced with respect to the first series of holes. Holes 34 are positioned substantially at the level of holes 36 and are within inverted U-shaped channels 38 in baffle 32.

Inwardly and radially extending spiral vanes 40 in the lower end of tubing string 14 just upstream of baffle 32 function as a liquid cyclone to distribute the higher density solids to the outside for injection thru holes 36, while the lighter or lower density solids pass thru axial passageway 42 for injection thru holes 34. By injecting ground nut shells and rock salt simultaneously in admixture thru tubing string 14 at high pressure and velocity, the rock salt is delivered into the fracture 30 in stratum 12 thru openings 36 and the ground nut shells (of considerably lower density) pass thru axial passageway 42 and holes 34 into the fracture opposite these holes. In this manner the distribution of the two materials is substantially that shown in FIGURE 1.

It is conventional practice to first fracture the stratum and then inject the propping agent in the tail end of the fracturing fluid. When injecting rock salt as the soluble propping agent, oil may be utilized as the fracturing fluid.

The invention is not limited to a downhole liquid cyclone separator but may be practiced utilizing separate streams of fracturing fluid, one containing permanent propping agent and the other containing temporary propping agent, one stream being injected thru the tubing and directional holes therein and the other being injected thru the annulus to provide the radial arrangement of the two types of propping agent. Any manner of injecting fluid streams of the two propping agents thru separate tubes and alternate holes to form radial fractures containing the propping agents may be practiced. When water is used as the fracturing fluid it is feasible to use oil soluble propping agents such as hard waxes or naphthenes and later dissolve these oil soluble materials with the selected oil or hydrocarbon. When operating with a hot stratum, it is feasible to inject the temporary relatively low melting point propping agent in cold water or oil so that the propping agent melts after a short time in the fracture due to the raising of the temperature thereof to normal stratum temperature.

In sandstone formations, a mixture of crushed limestone and sand may be used for fracturing followed by removal of the limestone with an aqueous acid solution. Hydrofluoric acid in this application further enlarges the flow channels in the sandstone in addition to dissolving the limestone.

Certain modifications of the invention will become apparent to those skilled in the art and the illustrative details disclosed are not to be construed as imposing unnecessary limitations on the invention.

I claim:
1. A process for fracturing and propping a subterranean stratum penetrated by a well which comprises the steps of:
    (1) injecting a fracturing fluid thru said well into a selected level of said stratum at sufficient pressure to fracture and raise the overburden;
    (2) depositing in alternate circumferentially spaced areas of the resulting fracture a relatively non-fluidizable solid particulate propping agent in a concentration supporting the overburden;
    (3) sequentially depositing in intervening areas a readily fluidizable solid particulate propping agent; and
    (4) thereafter, fluidizing the propping agent of step (3) and destroying the propping nature thereof so as to leave highly permeable flow paths formerly occupied by the fluidizable agent alternately spaced around said well with respect to the propped areas resulting from steps (1) and (2).

2. The process of claim 1 wherein the propping agent of step (3) is soluble and is removed by dissolving same in a suitable solvent.

3. The process of claim 1 wherein the propping agent of step (3) has a relatively low melting point and is removed by heating same with hot fluid.

4. The process of claim 1 wherein the propping agent of step (3) is combustible and is removed by burning.

5. The process of claim 1 wherein the propping agent of step (3) is rock salt and same is removed by dissolving in water.

6. The process of claim 5 wherein the propping agent of step (2) is nut shells.

7. The process of claim 3 wherein said propping agent is naphthalene.

8. A process for fracturing and propping a subterranean stratum penetrated by a well which comprises the steps of:
    (1) injecting a fracturing fluid thru said well into a selected level of said stratum at sufficient pressure to fracture and raise the overburden;
    (2) depositing in alternate circumferentially spaced areas of the resulting fracture a relatively permanent solid particulate propping agent in a concentration supporting the overburden;
    (3) sequentially depositing in intervening areas a temporary solid particulate propping agent; and
    (4) thereafter, removing the temporary propping agent of step (3) so as to leave highly permeable radial flow paths formerly occupied by said temporary propping agent.

9. The process of claim 8 wherein the permanent propping agent of step (2) is non-combustible and the temporary propping agent of step (3) is combustible; and said temporary propping agent is removed by in situ combustion.

10. The process of claim 9 wherein the temporary propping agent is nut shells.

11. The process of claim 9 wherein the temporary propping agent is a resin.

References Cited

UNITED STATES PATENTS

| | | | |
|---|---|---|---|
| 3,181,612 | 5/1965 | West | 166—42 X |
| 3,235,007 | 2/1966 | Kern | 166—42 |
| 3,237,693 | 3/1966 | Huitt | 166—42 |
| 3,241,613 | 3/1966 | Kern | 166—42 |
| 3,254,717 | 6/1966 | Huitt | 166—42 |
| 3,259,190 | 7/1966 | Parsons | 166—42 |
| 3,266,573 | 8/1966 | Rixe | 166—42 |

CHARLES E. O'CONNELL, *Primary Examiner.*

NILE C. BYERS, Jr., *Examiner.*